United States Patent [19]
Bustamante et al.

[11] Patent Number: 5,375,140
[45] Date of Patent: Dec. 20, 1994

[54] WIRELESS DIRECT SEQUENCE SPREAD SPECTRUM DIGITAL CELLULAR TELEPHONE SYSTEM

[75] Inventors: Herman Bustamante, Millbrae, Calif.; Francis Natali, Townsend, Wash.; David T. Magill, Palo Alto, Calif.

[73] Assignee: Stanford Telecommunications, Inc., Sunnyvale, Calif.

[21] Appl. No.: 980,957

[22] Filed: Nov. 24, 1992

[51] Int. Cl.$^5$ .................... H04L 27/30; H04M 11/00
[52] U.S. Cl. .......................................... 375/1; 380/34; 370/18; 379/58; 379/59; 379/61; 455/33.1; 455/49.1; 455/53.1; 455/54.1
[58] Field of Search ............... 375/1; 380/34; 370/18; 379/58, 59, 61; 455/33.1, 49.1, 53.1, 54.1

[56] References Cited

U.S. PATENT DOCUMENTS

| | | | |
|---|---|---|---|
| 4,268,722 | 5/1981 | Little et al. | 370/18 |
| 4,866,732 | 9/1989 | Carey et al. | 375/1 |
| 5,005,183 | 4/1991 | Carey et al. | 375/1 |
| 5,042,050 | 8/1991 | Owen | 375/1 |
| 5,115,463 | 5/1992 | Moldavsky et al. | 379/58 |
| 5,280,472 | 1/1994 | Gilhousen et al. | 370/18 |

*Primary Examiner*—Bernarr E. Gregory
*Attorney, Agent, or Firm*—Jim Zegeer

[57] ABSTRACT

The present invention is directed to novel implementation techniques which makes orthogonal CDMA practical in an a short range mobile telephone environment where significant multipath fading exists. Specifically, novel techniques for establishing the time base, frequency, and power control necessary to achieve orthogonality. Use of a high power sounding burst on the outbound link permits: 1) antenna diversity selection to minimize the probability of a faded condition, 2) local frequency locking at the subscriber terminal which avoids the requirement for a costly precision frequency standard, and 3) essentially instantaneous inbound power control based on the outbound receive signal level. This is effective since time division duplexing is used and both transmission and reception take place on the same frequency. With the short frame structure and unique placement of the sounding burst the correlation between the outbound and inbound path losses is very high. Thus, the signal structure and control algorithms result in a greatly reduced signal level range at the base station/PBX to achieve high efficiency in a orthogonal CDMA system. Real world effects such as filtering, multipath time spread, and time base error destroy orthogonality and introduce a degree of cross coupling between supposedly orthogonal channels. Thus, the system provides accurately controlled power levels in this highly dynamic environment.

15 Claims, 10 Drawing Sheets

SEPARATION OF WHIP AND LOOP MAY COMPROMISE POLARIZATION DIVERSITY PERFORMANCE. LOOP MUST BE APPROXIMATELY 3" SQUARE TO HAVE SAME SENSITIVITY AS WHIP.

NOTES: 4c → 4 Chips Guard Time
[*] → * is Optional
Tx → Transmit
Rx → Receive
Ai → A1 or A2, as selected by sounding
HS → Handset
BS → Basestation (Numbers in waveform are in units of voice channel symbols)

NOTES:
- 1 OW Symbol = PN Code Length = 255 Chips
- S1 + S2 + Φ ref = 510 Chips = 2 OW Symbols (no data)
- Φ ref = 118 Chips
- HSS = 388 Chips
- FS = 224 Chips = 7 Voice Channel Symbols
  = 14 Voice Channel Bits
- FS Counts from 0 to 63 (Outbound),
- P = Parity = 7 Voice Channel Symbols
  = 14 Voice Channel Bits

| STEP | OUTBOUND | INBOUND |
|------|----------|---------|
| 1 | RING ALERT | |
| 2 | | ACK RING ALERT |
| 3 | | ALLOCATE CHANNEL REQUEST (CSMA) |
| 4 | ACK ALLOCATE CHANNEL REQUEST | |
| 5 | | ALLOCATE CHANNEL REQUEST (ASSIGNED TDMA) |
| 6 | ALLOCATE CHANNEL | |
| 7 | | ACK ALLOCATE CHANNEL |
| 8 | MAKE LINK | |
| 9 | | <BEGIN TRANSCEIVING ON ASSIGNED CHANNEL> |

FIG. 10

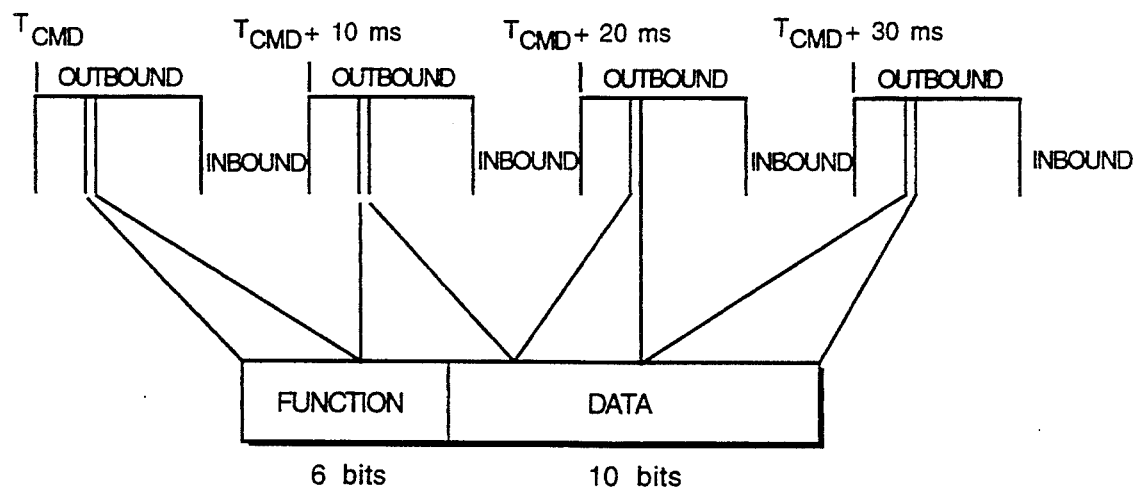

- $T_{CMD} = 640M + 40N$ msec

- 4 BITS (2 SYMBOLS) FROM EACH BURST, FRAME - SYNC'D

- RESPONSE (OF SAME FORMAT) FROM INBOUND BURST, 45 msec DELAYED

FIG. 11

WIRELESS DIRECT SEQUENCE SPREAD SPECTRUM DIGITAL CELLULAR TELEPHONE SYSTEM

DESCRIPTION OF PRIOR ART

Spread spectrum communication is characterized by modulation schemes which greatly expand the bandwidth occupied by a voice or data information signal. The two most frequently used schemes are direct sequence spreading and frequency hopping. In direct sequence frequency spreading, which is employed in this invention, a digitized information signal typically modulates a pseudo-random (also referred to as pseudo-noise or PN) digital signal. If the bit rate of the PN signal is, say 32 times as large as that of the information signal, the bandwidth of the resulting modulated signal becomes 32 times that of the original information.

The key to receiving spread spectrum signals is a receiver capable of generating a second PN signal identical to that used to spread the transmitted signal's bandwidth. This is possible because both transmitter and receiver use identical random digital sequence (PN) generator circuits. The PN signal is used by the receiver to synchronously demodulate the received signal. To do this successfully, the time-variations of the PN signal must be in synchronism with those in the received (modulated) signal. If they are not in time synchronism, the detected signal will be minuscule. Traditionally the time-phase of the PN signal generator at the receiver is varied slowly in time until signal output is found to be a maximum, and kept locked to the phase of the transmitter's PN generator by a phase-locked loop circuit.

Up until very recently, almost all spread-spectrum communications was employed in military communications, as a means of maintaining message security, to offset conventional forms of signal jamming, and/or to prevent enemies from being aware of even the presence of a transmitter. By utilizing a PN circuit whose time-variation repeats on a cycle of many days, an enemy would nave great difficulty determining the time-variation of the PN signal and thus could not extract the information in the communication. If a sufficiently large spread-frequency band were utilized along with modest signal power, it would even be difficult to observe the presence of such signals, using the conventional narrow-band receivers with which most radio communications is carried out. Furthermore, to be successful in jamming a spread spectrum communication, the jammer's power output must be increased in proportion to the amount of signal spreading in the signal to be jammed.

A second important feature of spread-spectrum communication, also used in this invention, is code-division multiple access. This involves carrying on a multiplicity of communications simultaneously, in the same bandwidth and geographic area, by using different time-varying PN codes which define each independent communication "channel".

Conventional wireless communication inside buildings or in densely built-up cities is made unreliable by signal "fading" due to the existence of many paths, of different lengths, through which radio waves travels between transmitter and receiver, e.g., by reflecting from wall, ceiling and floor surfaces. These multipath effects are extremely frequency sensitive. By expanding signal bandwidth through spread spectrum transmission, multipath fading can be reduced under some circumstances.

Diversity reception is a well-known technique wherein several receiving antennas are used in connection with one or more receivers and some form of manual or automated antenna switching. The object of such schemes is to overcome fading in propagation paths between transmitter and receiver, by selecting the signal from that antenna (or combination) whose received signal is strongest at any given instant.

SUMMARY OF THE INVENTION

The wireless telephone system of this invention provides for a combination of a base station unit and multiple handsets to provide, in the embodiment described herein, sixty-two concurrent communication channels.

Two operating environments are envisioned: indoor (within buildings) and outdoor. The operating range in each case will be limited to about 500 meters by (U.S.) Federal Communication Commission limits on transmitter power. Typically the indoor operating range will be on the order of 200 meters or less depending on the environment in which the system operates. The reduction of operating range is a result of multipath fading, which can be experienced due to intervening walls, partitions, or other structures between the handset and the base station.

One object of the invention is to achieve a wireless telephone system which is both reliable and economically producible. This is accomplished by the choice of communication techniques and waveform structure, and by the use of modern application specific integrated circuits (ASICs).

Another objective is to simplify manufacturing procedures and reduce costs through extensive use of digital signal processing techniques throughout the system. The use of digital circuits minimizes need for circuit adjustments, alignment or tuning often required by prior art wireless telephony equipment. In the preferred embodiments, a minimal part of the circuits are implemented using analog technology.

Still another object is to minimize, in a real-time sense, the effects of multipath transmission imposed by the operating environment. This is implemented through the combination of four specific techniques:

1) Mutual interference between the multiple user signals is minimized by use of pseudo-noise modulation signals which are orthogonal to one another, i.e. which can be independently demodulated.
2) Direct sequence spread spectrum modulation is used to provide protection against unintentional jamming by ambient narrow-band signals such as those from personal computer oscillators. It further protects against interference users sharing a common area, and provides users with a high degree of privacy.
3) Antenna polarization diversity reception is combined with a real-time means of selecting the antenna with the best signal-to-noise ratio (SNR).
4) Automatic power control is implemented so that all signals will be maintained at appropriate levels, thereby controlling mutual interference due to one communication signal overpowering others, where user handsets are located a widely varying distances from the base station.

Yet another object of this invention is to provide a multiplicity of 62-user channels within the 26-MHz band provided in the U.S. for this type of service (902–928 MHz). In the preferred embodiment, each 62-user group channel occupies approximately 2.16 MHz. This permits up to 12 base stations to operate within communication range of one another without interfering. The system embodiment described provides means to permit a handset user to move from the area served by one base station to that served by another, with automatic handoff from one to the other.

A further object of the invention is to provide means for interconnecting users for communication, and for connecting users to stations on remote telephone systems. In the embodiment described, this is done by connecting each base station to telephone switching equipment, providing each handset user with separate access to a local dial network, and through that to common carrier networks.

BRIEF DESCRIPTION OF THE DRAWINGS

FIG. 10 illustrates the location and utilization of control data embedded in voice transmissions, for system control during communication between a handset and base station, FIG. 11 is a voice channel control command format and extraction from voice channel signals.

DETAILED DESCRIPTION OF THE INVENTION

Figure 1:
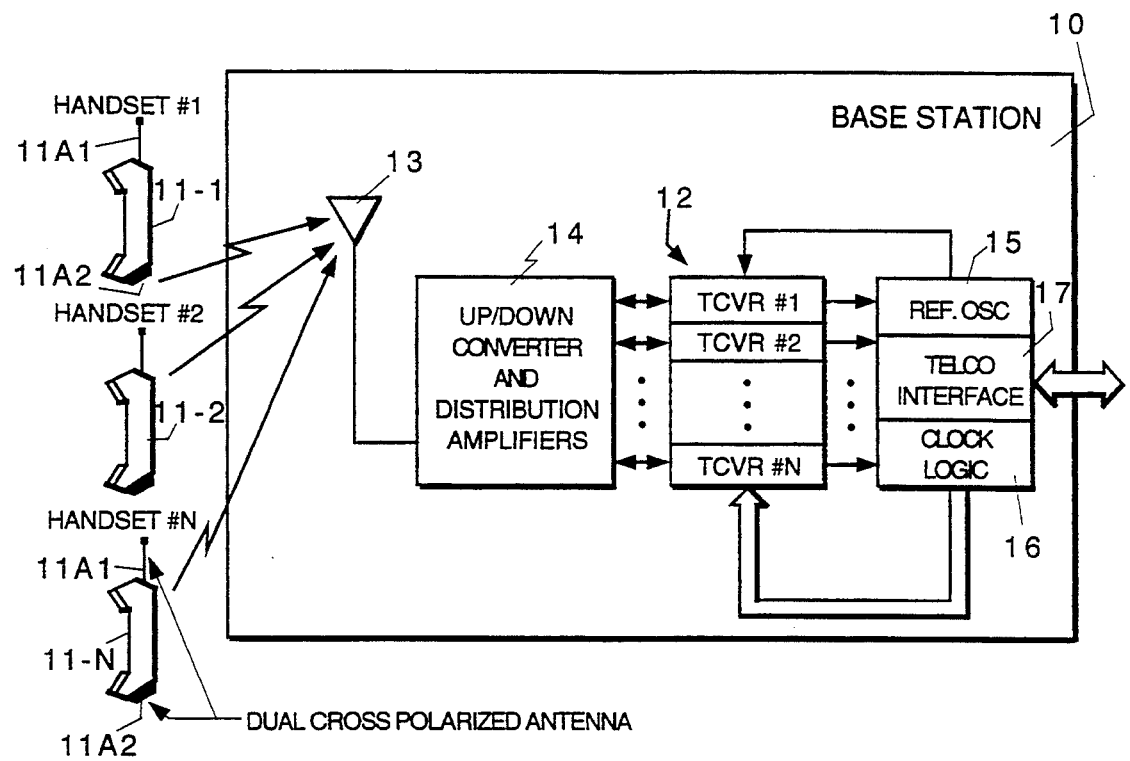
FIG. 1 illustrates a single base station embodiment of the invention in schematic form.

FIG. 1 illustrates the hardware configuration for one 62 user system hardware set, e.g., basic single base station system configuration. Each hardware set is comprised of one base station 10 and up to 62 handsets 11-1, 11-2 . . . 11-N with cradle. The system defines a star network configuration with the base station as the center of the star. The base station 10 contains one transceiver 12 for each individual user handset in the operating system. Polarization diversity is provided in the system by using dual cross polarized antennas 11A1 and 11A2 in each handset.

A single antenna 13 is used in the base station 10. Only one antenna is required because the communication channel is symmetrical with respect to direction, to and from the base station, so that dual cross-polarized antennas at the handset are sufficient to provide diversity in the system. Transceivers 12 are coupled by up-/down converter and distribution amplifiers 14 to antenna 13 and served by a common reference oscillator 15 clock, logic 16 and telephone system (TELCO) interface 17.

Figure 2:
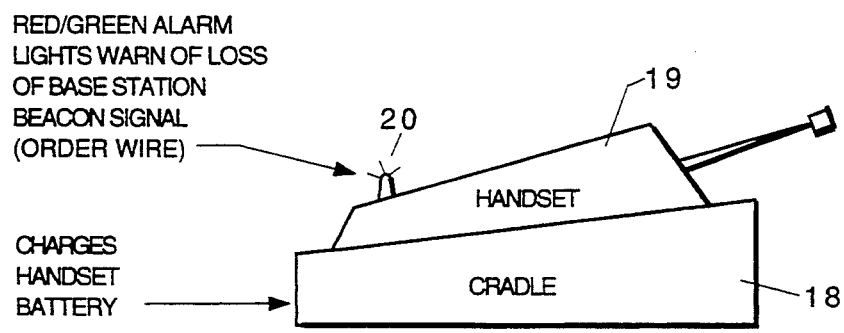
FIG. 2 shows a single handset, along with its removable cradle, a representative means to ensure that batteries powering it are maintained at full charge.

The handset hardware configuration is shown in FIG. 2. The handset cradle 18 serves two purposes. It provides a place to physically store the handset 19 when not in use, and it provides a charging capability to replenish the charge on the handset batteries as required. Red and green alarm lights 20 are provided on the handset 19. These lights 20 serve to indicate the adequacy of the physical location of the cradle. If the received signal strength is adequate, a green light will illuminate. If the received signal strength is not adequate a red light will illuminate and the handset 19 can be moved a few inches. Since the handset contains polarization diversity, the need to relocate the cradle location will almost never occur.

The primary purpose of the system in this embodiment is to provide voice traffic capability to the potentially mobile user community. In order to provide this capability, a telephone system (TELCO) support and interface capability is provided. This TELCO support functions consists of 1) call establishment operations support, 2) user information data base support and update, 3) multicall programming operations capability, and 4) peripheral support functions.

CALL ESTABLISHMENT OPERATIONS

This comprises interfacing with the TELCO, providing and interpreting all signaling operations required to establish both incoming and outgoing calls. This includes such things as dialing, a busy signal, and a phone ringing operation. All these functions are handled by the order wire (OW) channel and described in later herein.

USER INFORMATION DATA BASE

Figure 3:
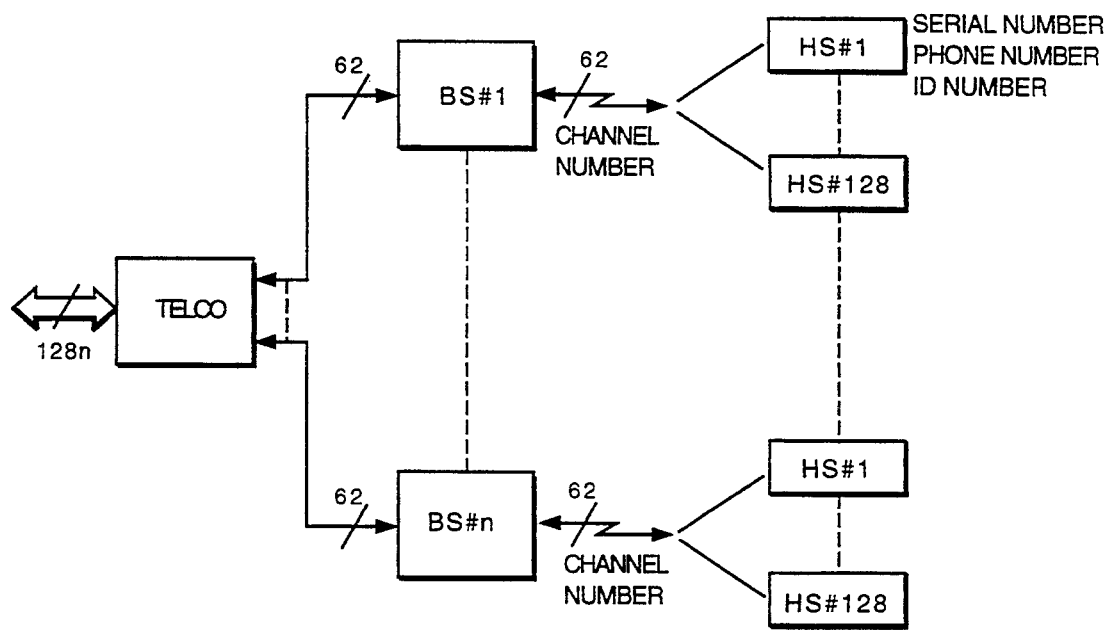
FIG. 3 shows in block diagram form a configuration including a multiplicity of base stations, each supporting in this case 128 handsets of which 62 may be in use at any given instant.

A typical multiple base station system configuration is illustrated in FIG. 3. A system of N base stations BS#1 . . . BS#N each with 62 voice traffic channel capability is shown. Also shown is that each base station may be required to support up to 128 (not all in use at once) users (HS#1 . . . HS#128) part time. For these assumed conditions the TELCO (this TELCO unit is sometimes referred to as a Mobile Telecommunications Switching Office (MTSO) base station system must have the capability to recognize and properly route calls to 128n different phone numbers (different users). This establishes that there are a minimum of four pieces of data required for each user as follows:

1) A serial number unique to a particular handset. This is a fixed, manufacturer assigned number and identifies the handset as an authorized system user.
2) An identification number identifies a handset as one of the 128 members of a particular user community associated with a base station. This is a number arbitrarily assigned by the base station when a handset becomes a member of its user community.
3) A channel number identifies one of the 62 voice traffic channels which are assigned for use arbitrarily each time a call is established.
4) The set of phone numbers are the phone numbers assigned uniquely by the TELCO to the set of system users.

A number of operations such as "three-way calling" and "call waiting" require the processing of multiple calls simultaneously while a call is in process. This demands the existence of a two-way control channel within the voice traffic channel. Such a control channel is provided and is described later.

There are also a number of support, or convenience, functions which may be provided. These are functions which are not critical to the basic system but which make the telephone more convenient to the user. This includes such things as "speed calling" or speed dialing, which permits the dialing of frequently called numbers by pushing only two buttons on the handset.

So long as users are confined to operate through only one particular base station, operations are well defined and the equipment need concern itself only with maintaining signal timing and appropriate transmitter power level. If the system is defined to consist of many base stations over an extended geographical area, or covering multiple floors in a multi-floor building, the user must be able to roam, or execute a handover operation from one base station to another. Thus, in a multiple base station system it is assumed that any user can roam from the cell area serviced by his original base station to the cell area covered by any other compatible base station.

The importance of a cell pattern is threefold: 1) it defines a minimum range between two cells sharing the same frequency thereby defining co-channel interference effects, 2) it can define the exclusive neighbors of any given cell thereby reducing the search time for a new cell when attempting a roaming/handover operation, and 3) it defines whether a multifloor building can be serviced without suffering significant interference between like cells on adjacent floors.

A twelve pattern is very desirable for all these reasons. A hexagonal 12 cell pattern has six uniquely defined neighbors per cell and provides a 6 cell radii separation between like cells. For multifloor operation, this provides 3 cell radii separation plus the attenuation between floors. For indoor operation it is likely that a square pattern may be used since a square, or rectangular, pattern may lend itself better for use within a building.

As a user roams about his cell, he will at times reach the boundary of good coverage. As the handset realizes it is reaching the limits of its operating range, it will identify the cell area he is about to enter. The handset will constantly search for signals from other adjacent user groups which are members of the total system but outside his present cell. This will be done by searching for other OW signals than the OW of his own cell group. In order to minimize the search time and minimize the likelihood of losing the presently in use voice channel before he can establish a new one with the next base station, a handset maintains a data base defining relative timing between all adjacent base stations. The details of this operation are presented later.

Once the OW of the "next" cell is contacted, the handset must now require admission to the cell as a new user. If admitted, the handset is assigned an identification number as an authorized user of the group. At this time all pertinent data on the handset, i.e., handset serial number, identification number, and telephone number must be relayed to and stored in the base station database. The local TELCO data base must also be updated so that it knows where, i.e., to which base station, to direct calls intended for that particular telephone number. If a call is in progress, handover now involves the local TELCO intimately. The local TELCO must now not only have its data base updated, it must re-route a call in progress from one base station to another in real time.

The system is limited by FCC rule to operating with no more than 1 watt (30 dBm) transmitted power from either the handout or the base station. Based on this, the base station is clearly the limiting factor. However, according to the invention, a very viable system can be set up while satisfying the 1 watt total maximum power limitation. In general when servicing a densely populated user community high capacity base stations capable of servicing a large number of users can be employed and will operate over a relatively short range. Alternately, when servicing a sparsely populated user community, lower capacity base stations capable of servicing a smaller number of users can be utilized operating over a greater communication range.

AUTOMATIC GAIN CONTROL

USER TO BASE STATION

Each base station incorporates a fixed reference signal level against which all estimates of received handset signal levels are compared. On the basis of these comparisons, the transmit power bias term in each handset is adjusted as described later. The power control system can maintain the power received at the base station from each handset to within an accuracy of about 1 dB without the need for AGC circuitry in the base station.

BASE STATION TO USER

The base station transmit power level is held fixed at the maximum power setting. As a handset is transported throughout the cell, its received signal level will vary over a maximum dynamic range of about 90 dB. In order to maintain the input voltage to the main signal path analog-to-digital converter in the user unit at nominally half of full scale, and thereby avoid clipping and loss-of-resolution problems, an AGC function is implemented prior to the analog-to-digital.

FREQUENCY PLAN

Figure 4A:
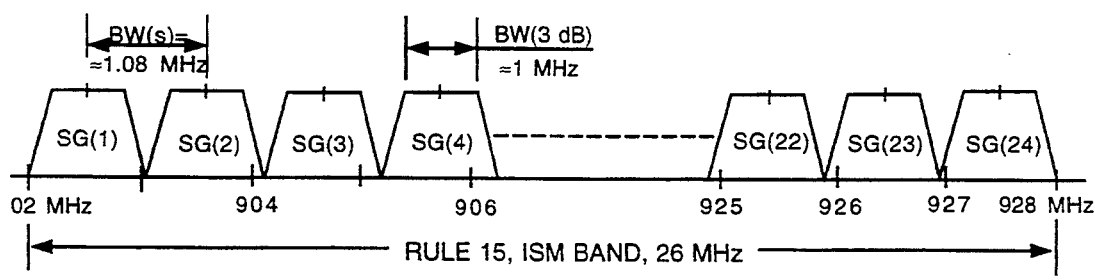
FIG. 4A illustrates the assignment of (group) channels in a portion of the electromagnetic spectrum allocated for use by this type of communication service.

The system RF frequency plan for the disclosed embodiment is illustrated in FIG. 4. The FCC rule 15.247 band intended for this type of application extends from 902 MHz to 928 MHz, providing a 26 MHz total system bandwidth. Each subgroup signal is allocated a 1.0833

MHz bandwidth such that a total of 24 subgroups can be accommodated.

The frequency spacing between adjacent subgroup carrier frequencies is set to 1.0833 MHz. The 3 dB bandwidth of each subgroup signal is set to approximately 1 MHz, or about 80% of the signal spectrum central lobe bandwidth.

Figure 4B:
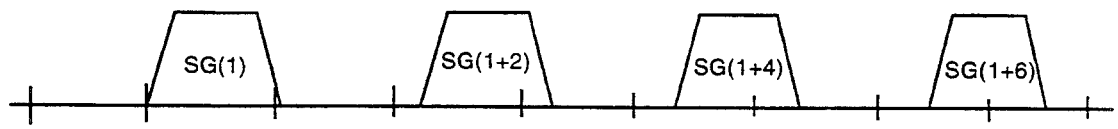
FIG. 4B illustrates the use of alternate channels in a given physical area to minimize interference between groups of handsets.

In order to minimize adjacent channel interference, two adjacent subgroup channels will not be assigned to any given base station. Only alternate subgroups will be assigned for operation within a given base station. FIG. 4b shows a typical subgroup assignment for a four subgroup system.

The advantage of using only alternate subgroup bands within a given system, or cell, is that it permits realization of a significant excess attenuation on possible adjacent channel and co-channel interference signals.

The system provides the feature that different PN sequences may be used in different cells. The use of different PN sequences in like cells minimizes co-channel interference. Different PN sequences would be used in like cells when a given cell configuration forces like cells to be placed closer to each other than desired.

POLARIZATION DIVERSITY

Antenna polarization diversity at the user handset is selected, in the preferred embodiment, as the most effective method to reduce multipath fading. Implementation of polarization diversity at the handset requires two antennas at the handset and a single switch to select between them. Channel sounding is performed in order to select the best antenna, in each 10 ms time subframe.

Figure 5:
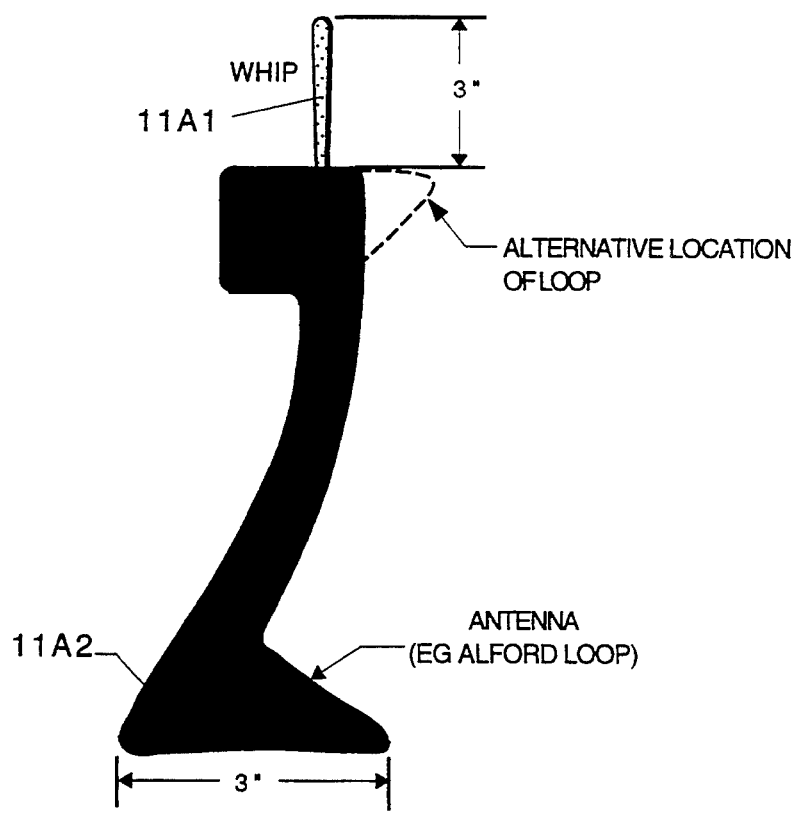
FIG. 5 shows a representative configuration for the handset, with a vertically polarized whip antenna mounted at top and a horizontally polarized loop antenna embedded in its base, FIG. 6 Portrays one 10 millisecond frame of a preferred overall (order wire and voice channel) signal structure.

Studies conducted indicate that polarization diversity provides an improvement in signal reception capability as good as or better than any other diversity technique. The use of polarization diversity does not impact system capacity as some techniques do and, the additional hardware complexity required to add polarization diversity is minimal. The system implements the use of dual cross polarized antennas at the handset. A typical handset antenna configuration is illustrated in FIG. 5. The antenna configurations shown in FIG. 5 makes use of a whip 11A1 and an Alford loop 11A2. Separation of whip 11A1 and loop 11A2 may compromise polarization diversity performance but will then provide spatial diversity. In the preferred embodiment, the loop should be approximately 3 inches square to have the same sensitivity as whip antenna 11A1.

The base station antenna pattern should be appropriate to the area to be served. If the Base Station is located in the center of the service area its pattern should be omnidirectional in the horizontal plane. In most cases, the user will be distributed over a narrow vertical span and the Base Station antenna can have a narrow vertical pattern. Such patterns are ordinarily obtained by the use of vertical linear arrays. A convenient element for such an array is the Lindenblad radiator invented in 1936 for use at 120 MHz. It is an assembly of four dipoles spaced around a center support post; tilted at 45 degrees, and fed in phase.

This antenna provides a circular polarized wave. An array of these elements can easily be assembled to narrow the vertical pattern, with a practical limit imposed by the space available for mounting. This assembly has been used commercially. The advantage of the Lindenblad design is that it is simple and very tolerant of implementation variations. It has been used in many applications up to frequencies in X-band. In constructing the array due attention must be given to the mutual impedance between array elements. The practical limit for array gain is somewhere around 10 dB where the 3 dB beam width becomes about 20 degrees.

In the event the user distribution is wide in the vertical direction—as for several floors in a tall building, a less directive antenna would be desired. Then a single element or short array would be preferred.

MULTIPLE BASE STATIONS: SYNCHRONIZATION

When two handsets operating in two mutually adjacent cells (served by different base stations) find themselves near each other and at the cell boundary, an adjacent channel interference (ACI) ratio of I/S=80 dB or more can result. If the two cell systems are not synchronized, and if one handset is transmitting while the other is receiving, operations at both handsets will be disrupted. This can be avoided by making adjacent base stations mutually synchronous to an accuracy of $\pm 8$ $\mu s$. This is so because there is a 16.6 $\mu s$ minimum gap time between successive receive/transmit time intervals in each subframe.

The preferred timing approach in this disclosed embodiment is to provide input from a precision timing source to a central site (one of the base stations (FIG. 3) is designated to be Master base station). This timing signal can then be distributed to a constellation of base stations along with the other TELCO interface lines. This approach applies to both indoor and outdoor base station systems. In an indoor system there would be one Master base station or central site. In an outdoor system there could be many depending on the extent of the system and its configuration.

Synchronization for a limited system, for example, a system intended to service one building, is not a problem. One base station can be designated as the Master station and it would distribute timing to all other base stations. The timing signal can be distributed along with the TELCO interface wiring. Alternatively, the GPS, local telephone company central office time source, etc. can be used.

SIGNAL STRUCTURE, DATA CONTENT, PROTOCOLS, AND SIGNAL PROCESSING

In this embodiment of the invention, the signal structure for the system is predicated on two underlying objectives:

(1) to operate synchronously with 20-msec frames of a 16 Kbps voice encoder/decoder, and (2) to keep added signal path delays to under 10 msec.

Figure 6:
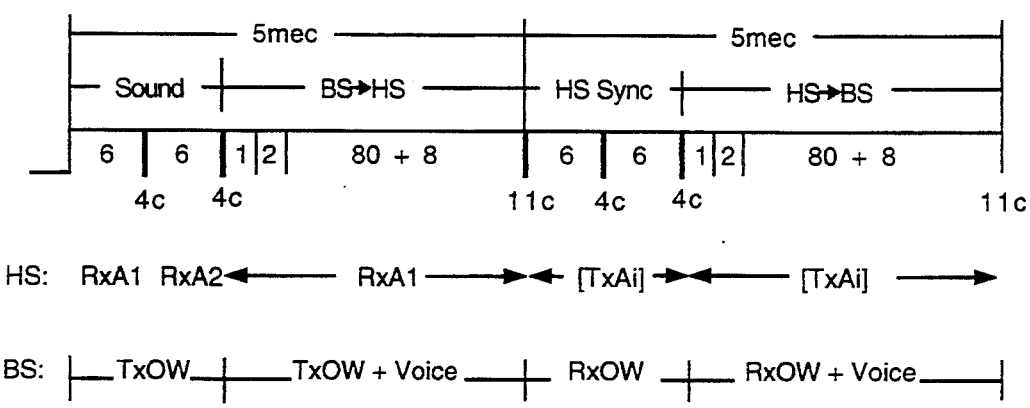
Figure 7:
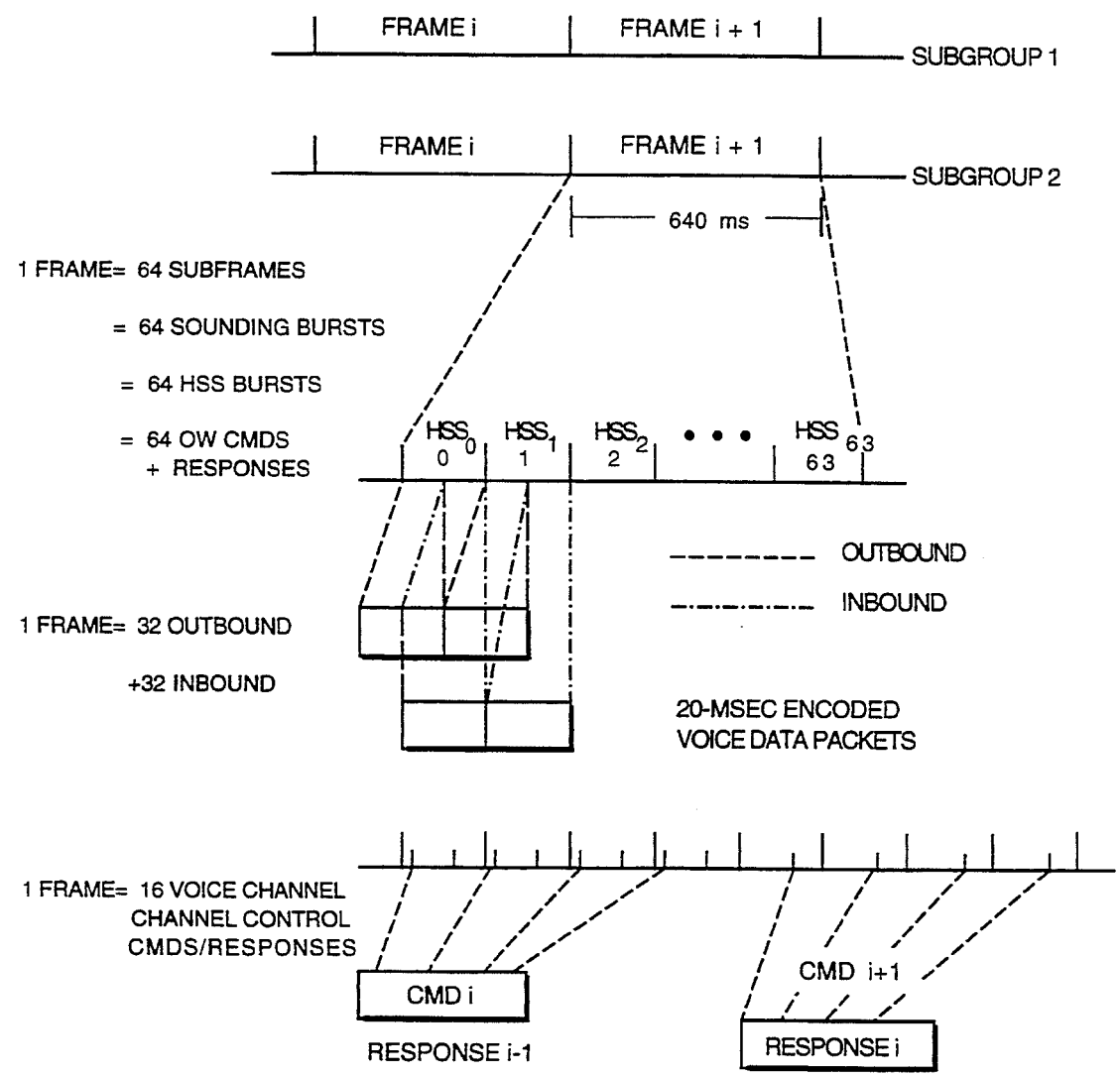
FIG. 7 shows the combination of sub-frames into a 640 millisecond signal.

Accordingly, the preferred signal structure is a sequence of 10-msec subframes, as shown in FIG. 6, each consisting of four distinct periods, two for inbound and two for outbound signalling, and each being one of 64 subframes composing a 640-msec frame as shown in FIG. 7. The inbound signals are spread with a different PN code than the outbound signals but with the same code length and chipping rate.

The voice channel data consists of 16 Kbps bidirectional digital voice, plus a 400 bps bidirectional control link. The data modulation is differentially encoded QPSK, transmitted at a burst rate of 20.72 Kps. The data signal is bi-phase modulated with a spreading code at 32 times the burst symbol rate (663 KHz). The spreading code is the modulo-2 sum of a length-255 PN sequence and a length-32 Rademacher-Walsh (R-W) function. The all-ones R-W function is used as an orderwire channel within each 32-channel subgroup; the remaining 31 functions are each associated with a different voice channel in that subgroup.

From the perspective of a handset already associated with a particular base station, the four time periods within each subframe may be viewed as follows:

Throughout this discussion, the term "symbol" is used to mean "voice channel symbol duration", i.e., 32 chip times, even when the activity is on the order wire channel. The term "voice channel" means one frequency channel and non-unity Rademacher-Walsh code combination.

(1) (SOUND) The base station transmits a 12¼ symbol allones sounding pattern (i.e., no data transitions) on each order wire channel, at a level 15 dB higher than for individual BS→HS voice channels; each handset receives the first six symbols on one antenna A1, switches to the other antenna A2 during the next ⅛ symbol, receives the next six symbols on A2, compares the power between A1 and A2, chooses the antenna with the higher power, and switches to that antenna during the next ⅛ symbol.

The power level from the chosen antenna is used by the handset to determine transmit power during the following HS SYNC and HS→BS portions of the signal, and also as a code sync error measure to be input to its delay lock code tracking loop.

(2) (BS→HS) On each active voice channel, the base station transmits a voice data burst of 91 QPSK symbols, followed by a guard time of 11 chips. The handset receives this data on the antenna selected during the sounding period. The voice channel data is constructed as follows:
1 phase reference symbol
2 channel control symbols
80 encoded voice data symbols
8 spare symbols (reserved for future use)

(3) (HS SYNC) On an automatic cyclic time division multiple access (TDMA) basis, one member handset in each 64 member subcommunity (i.e., one per order wire channel) transmits a continuous all-ones ranging signal (i.e., no data transitions but PN chip transitions) to the base station on its associated order wire channel for a duration of 12¼ symbols, followed by a ⅛-symbol guard time. The base station order wire channel performs a delay lock loop error measurement on this signal, and prepares and queues a timing correction command, if required, to be sent to that handset at the next opportunity. Each transmitting handset transmits using the antenna it selected during the sounding period, at a power level determined from the power received by that antenna during that period.

(4) (HS→BS) On each active voice channel, the handset transmits a voice data burst of 91 symbols, followed by a guard time of 11 chips, on the antenna selected during the sounding period. This inbound burst is of the same format as the BS→HS burst of period (2).

Thus the time-division duplex signal is symmetrical, with respect to format and content, its inbound and outbound portions being essentially identical to each other, of the total time available, 77.2% is used for voice data, 10.6% for related overhead and spare capacity, 5.8% for channel sounding, 5.8% for handset timing synchronization, and 0.6% for various switching and guard times.

Advantages of selected signal structure include:

1) One dedicated bidirectional order wire channel (for link control) for each 31 voice channels.
2) No voice channel activity during sounding burst (at 15 dB higher than individual voice channels, allows very accurate measurements of received power, time offset, and frequency offset.
3) Dedicated handset sync per channel allows accurate measurement of handset power and time offset with no interference due to timing errors in other channels.
4) Bidirectional 400 bps control link incorporated into each voice channel (for handset power and timing control, as well as link control).

ORDER WIRE CHANNEL SIGNAL STRUCTURE

Figure 8:
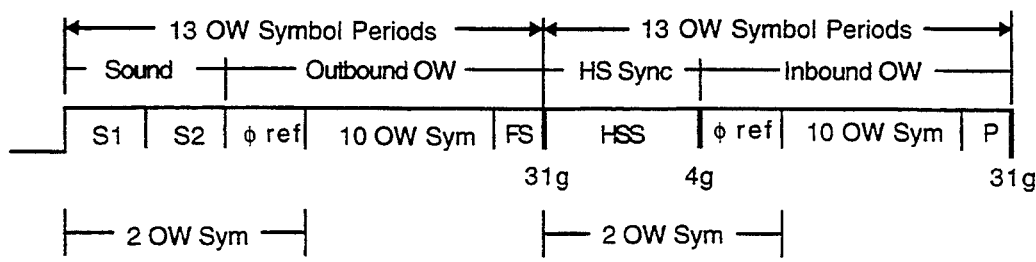
FIG. 8 illustrates the detailed signal structure of an order wire channel.

The order wire channel signal structure is shown in FIG. 8. Four periods of the overall time-division duplex structure are superimposed on an order wire signal structure consisting of (in each direction) two OW symbol periods followed by ten actual OW symbols plus a 7 voice channel symbol frame sync/parity check signal and a 31-chip guard time. Each half subframe is exactly 13 OW symbol periods in duration.

The order wire signal structure has been designed so as to maximize signal search effectiveness, i.e., to minimize expected search times. Each OW symbol period=255 PN chips=one PN code sequence length, thus by taking energy measurements over one OW symbol period, we are integrating over one PN code sequence length and taking full advantage of the PN code's autocorrelation properties.

Also, the choice of an exact integer number of PN sequence lengths per half subframe both 1) greatly simplifies the PN coder design and the search algorithm, and 2) is critical to avoiding code phase ambiguities which would increase typical and worst-case initial search times by more than ten fold.

During the two sounding periods, the switching times allotted at the end of each, and the reference phase period (i.e. for a total of (192+4) * 2+118=510 chips=2 OW symbol periods), the base station is transmitting a continuous (spread) tone corresponding to an all-ones data modulation (i.e. no, data transitions). The next 10 OW symbols contain order wire data, as described below.

The outbound order wire channel frame sync field contains 7 voice channel symbols (14 bits) organized as 6 bits parity check on the 20 OW bits, 6 bits subframe number within frame (0–63), and 2 bits parity check on the subframe number. Thus 12/13=92.3% of the base station order wire channel transmit Lime (i.e., 46.1% of the total time) is available to handsets for signal acquisition purposes.

The inbound order wire signal format consists of two segments. During the first, on a cyclic basis, one handset out of each community of 64 transmits a continuous (spread) tone corresponding to an all-ones data modulation (i.e. no data transitions), for a duration of 388 chips, for the purpose of allowing the base station to measure that handset's transmit code synchronization, power, and quality during a period wherein there is guaranteed to be no interference from other handsets on the same channel.

Four chips guard time later, if the current order wire time slot is assigned, the handset assigned to this slot transmits first a 118-chip phase reference symbol, then 10 OW symbols, and finally a 7-voice-channel-symbol (14-bit) field containing a parity check of the 20 order wire bits; the last 31 chips of the inbound order wire signal segment are merely guard time.

If the current order wire time slot is not assigned, it may be accessed by roaming handsets seeking membership in a new base station community, or by handsets which have just been switched from STANDBY to ACTIVE mode and are seeking a voice channel assignment. The signal structure for such accesses is identical to that for assigned accesses.

ORDER WIRE CHANNEL DATA STRUCTURE AND PROTOCOL

Figure 9:
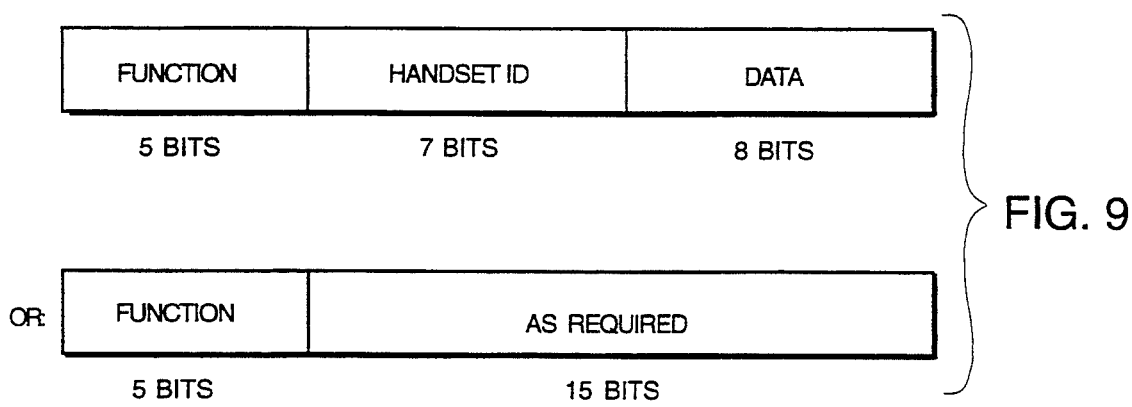
FIG. 9 is a generic representation of information layout of order wire commands and the associated response.

Each outbound order wire burst contains a 10-symbol (20-bit) order wire command, formatted as shown in FIG. 9. The 5-bit function field specifies which of the various command or broadcast functions is being invoked. For most command functions, a 7-bit handset ID field is also included to specify to which of up to 128 handsets in the local base station community the command is directed. The remaining 8 bit; (or in some cases, all remaining 15 bits) are defined as required by the specific command or broadcast function.

The response to any outbound (i.e., to a handset) command or inbound request which requires a response will be provided in the third half subframe following that command or request. Failure to receive a valid response at that time shall be considered an error and shall cause recovery measures to be taken. Thus, each third half sub-frame following a base station command requiring a response is defined as being assigned, and is not available for use by handsets attempting to initiate communication.

A handset's response to a base station command requiring-one is to echo the received command's function and handset ID fields, and follow with whatever additional meaningful information is required for that command. Thus a handset response generally constitutes a specific acknowledgement of the received command, plus an implied request for the next step in the dialog leading to the end objective. Similarly, a base station's response to a handset request both acknowledges the request and provides the next step in the dialog toward the desired objective.

The example diagrammed in FIG. 10 and described below serves to illustrate this:

(1) A base station detects that an incoming call from the TELCO interface is directed to a handset with the corresponding telephone number. It then schedules a Ring Alert command to be sent to the handset, addressed to it via its 7-bit Handset ID.

(2) On recognizing its ID, the handset responds by echoing the Ring Alert Command and enabling a local "ring" function.

(3) When the user picks up the handset and switches it from STANDBY to ACTIVE mode, the handset disables the local ring function and attempts to reestablish the dialog by issuing an Allocate Channel request in the next available CSMA slot.

(4) Assuming for the moment that the CSMA Allocate Channel request is received properly at the base station (recovery from collisions and other errors is discussed in sections later herein), the base station echoes the Allocate Channel request to the requesting handset, (5) which then resubmits it in the now implicitly assigned (i.e., "guaranteed" collision-free TDMA slot 15 msec later.

(6) Having thus confirmed the Allocate Channel request, the base station then allocates a voice channel and issues a channel Assignment command to the handset, (7) which echoes the Channel Assignment command in acknowledgement.

(8) Having thus confirmed that the handset has correctly received the channel assignment information, the base station connects the corresponding TELCO line to the allocated voice channel and issues a Make Link command to the handset, (9) which then begins transceiving on the assigned voice channel.

For calls originating at the handset, essentially the same procedure would be followed, except for steps (1) and (2), which of course would be eliminated.

At the end of any call, the user would switch the handset from ACTIVE back to STANDBY mode, and the handset would signal a Deallocate Channel request to the base station via its in-band order wire (or channel control) path (see Section 3.6). This request would be acknowledge by the base station, via the same path, prior to releasing the channel on either end.

ORDER WIRE CHANNEL DATA STRUCTURE

Approximately 15 specific order wire channel commands are necessary or very useful. Some are "broadcast" by the base station on the order wire channel to indicate network status. Others are involved in initiating communication with a handset, terminating communication, and adjusting timing. These include:

1) Ring Alert command.
2) Allocate Channel request.
3) channel Assignment command.
4) Make Link command.
5) Deallocate Channel request.
6) Base Station Memberships Available broadcast. The 8-bit data field of the broadcast contains the number of memberships currently available in this base station community. This broadcast will occur at least once every 200 msec on each order wire channel.
7) Membership Enrollment request. Submitted on a CSMA basis by roaming handsets seeking membership in a new community.
8) Enrollment Interview commands. Eight different commands, actually: three to get the 24-bit handset serial number, three to get the 24-bit handset telephone number, one to identify the previous membership cell, if any, and one to assign a 7-bit ID number to the handset, thereby completing its acceptance into the new cell community.
9) Adjacent Cell Map broadcast. The 12 lease significant bits of this broadcast indicate, for each of 12 possible frequency cells, whether that cell is (1) adjacent to the current cell or (0) not adjacent to the current cell.
10) Adjacent Cell Time Offset report. Three different reports, actually: one to indicate PN code phase offset, one to indicate symbol offset within a subframe, and one to indicate subframe offset within a frame. The 8-bit data field of these reports indicates the particular offset, relative to the current cell, of the adjacent cell base station identified in the Handset ID field. These reports are submitted, initially on a CSMA basis, by any scouting or roaming handset, and are then confirmed on an assigned TDMA basis.
11) Adjacent cell Time Offset broadcast. Three different broadcasts, actually: one to indicate PN code phase offset, one to indicate symbol offset within a subframe, and one to indicate subframe offset within a frame. The 8-bit data field of these broadcasts indicates the particular offset, relative to the current cell, of the adjacent cell base station identified in the Handset ID field.

12) Voice channels Available broadcast. The 8-bit data field of this broadcast contains the number of currently unassigned voice channels within this base station. This broadcast will occur nominally once each second.

13) CSMA Statistics broadcast. The 15 least significant bits of this broadcast contain CSMA slot capacity, loading, and collision statistics for the previous 1-second period.

14) Adjust Transmit Code Phase command. The 8-bit data field of this command is a two's complement number indicating the handset transmit code phase adjustment, in sixteenths of a chip to be advanced; thus a value of $-3$ would indicate to retard the transmit phase of the handset identified in the Handset ID field by 3/16 of a chip. Data values outside the range of $-4$ to $+4$ are ignored.

15) Adjust Transmit Power Level command. The 8-bit data field of this command is a two's complement number indicating the handset transmit power adjustment, in units of db gain; this value is essentially added to the transmit power control bias term (see Section 4.3) of the handset identified in the handset ID field. Data values outside the range of $-4$ to $+4$ are ignored.

CARRIER SENSE MULTIPLE ACCESS (CSMA) ISSUES

Handsets seeking entry to a cell (i.e., a base station) are unknown entities to the base station, thus the invention provides for the handset to access the base station. Also, in order to accommodate other asynchronous events (e.g., handset transition from STANDBY to ACTIVE mode and requesting allocation of a voice channel) and avoid the delays inherent in a purely cyclical or polling approach, again, some other means is desirable.

A carrier sense multiple access (CSMA) approach seems well suited to supporting these relatively infrequent demands, but it brings with it the requirement to manage the CSMA resources intelligently. Several design features have been incorporated in this regard.

First, the fraction of slots available for CSMA use will be arranged to provide a suitable probability of no collision on the first access attempt.

Second, the base station will maintain statistics of the use of available CSMA slots and will broadcast these statistics to the handsets for use in making intelligent choices of initial access and backoff strategies.

Third, the powerful parity check code included in inbound order wire transmissions minimizes the possibility that when collisions do occur they would not be recognized as such, thus the likelihood of the base station erroneously interpreting the demodulated results of collided transmissions is extremely low.

Any CSMA access attempt which is not acknowledge within 35 msec will be considered to have failed, the appropriate backoff strategy will be selected, and a retry will be scheduled accordingly.

VOICE CHANNEL CONTROL DATA STRUCTURE AND PROTOCOL

Each voice channel burst contains a 2-symbol field allocated for channel control, i.e., inband order wire functions such as handset transmit power control, handset transmit code phase control, and other functions to be identified. This provides a capacity of:
200 symbols/sec = 128 symbols/frame
400 bits/sec = 256 bits/frame in each direction, inbound and outbound, for these purposes, so that handsets with calls in progress still have access to full order wire functionality as described earlier.

Outbound channel control data is organized into 16-bit commands and acknowledgements formatted as shown in FIG. 11 and frame synchronized to provide 16 such commands per frame (25 per second) per voice channel.

Each command is composed of a 6-bit function field and a 10-bit data field. Unlike the order wire channel, no handset ID field is required since the handset being addressed is implicit in he voice channel assignment.

Inbound channel control data is organized into 16-bit requests and acknowledgements formatted identically to outbound commands and synchronized with them but offset by half a subframe. Inbound responses to outbound commands commence three half-subframes after the command transmission is complete, and outbound responses to inbound requests commence in the burst following completion of the request.

DETAILED SIGNAL PROCESSING OPERATIONS

The following describes the signal processing operations and sequences utilized by the system to acquire and track the signal, maximize its quality, demodulate data from it, determine when to transfer to an adjacent cell, and accomplish such transfers.

INITIAL SIGNAL ACQUISITION (HANDSETS ONLY)

When a handset is first powered on, it is assumed to have a priori knowledge of its "home" base station PN code and frequency channel, but to have no knowledge of its time offset from that base station, and to know to within only 9 KHz its frequency offset from nominal for that channel. (The frequency offset from nominal at the base station is assumed to be less than 100 hertz.)

The initial search resolves these time and frequency uncertainties by seeking to acquire the base station order wire signal at each of 255*2=510 PN code phase uncertainty states and 19 frequency bins spaced 1 KHz apart. Each of the resulting 19*510=9690 composite uncertainty states is examined for 398.44 $\mu$sec (=one 255-chip PN sequence length), and since there are 3 correlators per receiver, a total of 9690 * 398.44 $\mu$sec/3=1.29 sec would be required to complete the search if the signal were constantly present.

Since the base station order wire signal is present only half the time, however, (the inbound signal being spread with a different PN code), each uncertainty state must be searched at least twice, once at time t and again t+(2n+1)*5 msec, so the total time required to acquire PN chip sync (to within 0.25 chip or so) and resolve frequency offset (to within 500 Hz or so) is at least twice this, or 2.6 seconds.

If the peak power measure of all the uncertainty states is not at least TBD db greater than the average of all the non-peak states, then it is assumed that the first attempt failed due to an antenna null, and the search process is repeated on the other antenna, for a worst case total of 5.2 seconds.

Note again that subsequent acquisitions will in general be essentially instantaneous, because the initial acquisition and carrier pull-in will have removed all frequency uncertainty, and Adjacent cell Time Offset broadcasts will have eliminated most code phase and other time uncertainties.

Note too that acquiring PN code phase sync automatically also achieves OW symbol sync, but an additional several frames will be required to achieve frame sync and carrier pull-in prior to being able to demodulate data. These processes are described in the sections following.

SUBFRAME SYNCHRONIZATION (HANDSETS ONLY)

Figure 12:
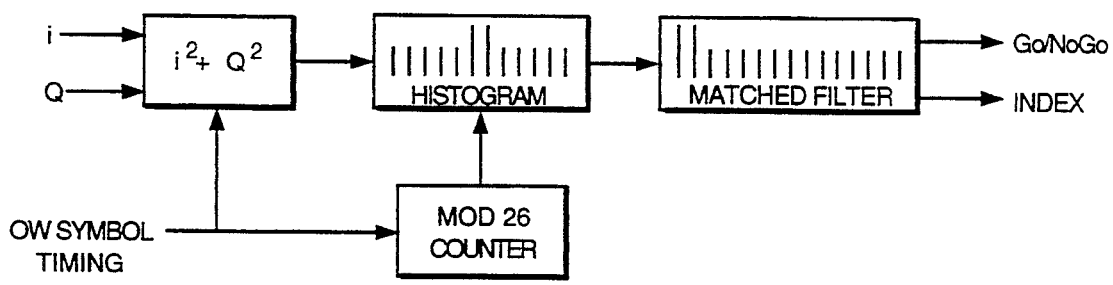
FIG. 12 is a general block diagram of the sub-frame synchronization incorporated in the invention.

Subframe synchronization is achieved as follows (see FIG. 12):

1) Return the coder and the carrier frequency to the code phase and frequency corresponding to the initial acquisition energy peak (with the order wire signal still selected).
2) Observe 3 subframes of (I,Q) measures from the correlator, each integrated over one OW symbol; in particulars, observe the power profile of the data (modulo 26 OW symbol times per subframe), determine the peak power measure, and verify that it is at least 9 db above the average of the others. This corresponds to the onset of the outbound sounding burst at the start of each subframe.

This observation is accomplished by constructing a 26-element histogram, clearing all elements to zero, then adding to each the power measure of the corresponding (I,Q) sample (that is, sample number i mod 26, for i=0 to 77), where the measure of power is defined as $I^2+Q^2$.

3) The histogram index j such that $$h(j) > h(i), \text{ all } i \neq j$$

and $$h(j) > Pavg + 9 \text{ db}$$

where $$Pavg = (Ptot - h(j) - h(j+1 \text{ mod } 26))/24$$

and $$Ptot = \text{Sum } (h(i), i=0, 77)$$

represents the delay, in OW-symbol increments, of the actual frame start relative to the postulated frame start (i=0). If no such index j exists, then repeat steps (2) and (3) using the other antenna.

4) Set OW symbol count $=(26-j)$ mod 26. (OW symbol count will be incremented by 1 (modulo 26) on each subsequent OW symbol). This completes the frame sync process, so it may be disabled and the carrier and code tracking functions enabled.

ANTENNA SELECTION AND TRANSMIT POWER CONTROL (HANDSETS ONLY)

Figure 13:
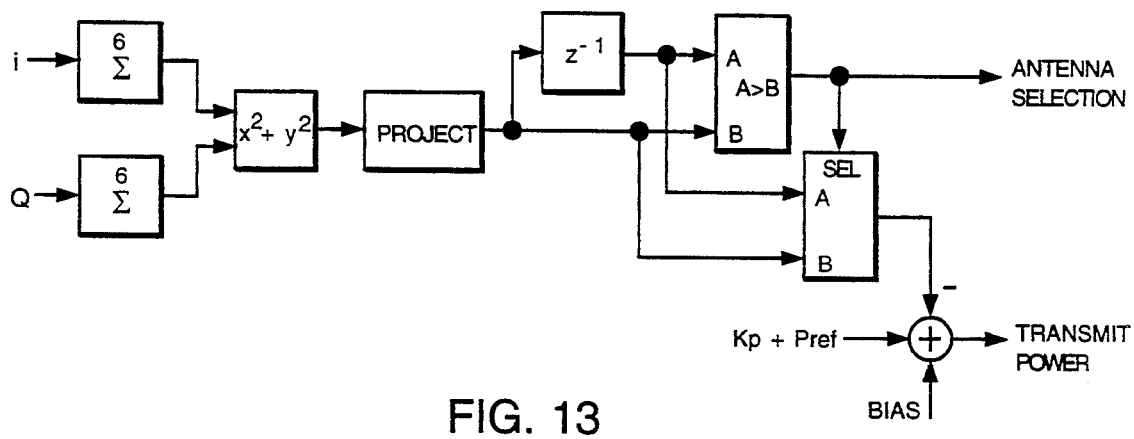
FIG. 13 is a block diagram of signal power measurement for antenna selection and transmit power control.

During each of the two sounding bursts at the start of each subframe (one burst received on each antenna), a power measurement is made and projected to the midpoint of the inbound signalling period. The antenna corresponding to the larger projected power measure is selected to be used during the remainder of the subframe (both outbound and inbound portions). The larger projected power measure itself, plus a bias correction term determined by the base station over a longer time frame, is used to set the power level for the inbound transmission (if any). Reference is made to the elements shown in FIG. 13.

The power is measured for each sounding burst as follows: (I, Q) samples are input from the correlator and integrated in integrators coherently over 6 voice symbols; total power is then computed from these burst-coherent (Ij, Qj) measures as $P1 = I1^2 + Q1^2$; antenna 1
$P2 = I2^2 + Q2^2$; antenna 2 and projected to the midpoint of the inbound signalling period:

$PWR1 = P1 + 0.75 * (P1 - P1')$; proj=current+0.75*
$PWR2 = P2 + 0.75 * (P2 - P2')$; (current-previous)
$P1' = P1$; $P2' = P2$; set previous=current Antenna Selection is then simply
If $PWR1 > PWR2$
then select antenna 1 (k=1)
else select antenna 2 (k=2)

The antenna selected algorithm is the same independent of whether a call is in progress on the handset.

The transmit power Pxmit for this subframe is then computed as $$Pxmit = Kp + Pref - \log (PWRk) - Atten + Bias$$

where
Kp=nominal transmit power for log (PWRk)=Pref−Atten+Bias
Pref=reference receive power level.
Attn=attenuator setting set by AGC (see Section 4.9)

This bias correction term for each handset is determined at the base station once each 64 frames as follows:

$$Bias = Bias + K1d * \log (Prcv/Pref)$$

where
Prcv=Pp from base station code phase tracking function (see Section 4.5.2).
$= Ip^2 + Qp^2$, Ip and Qp integrated coherently over a 12⅜ symbol handset sync period
Pref=reference receive power level and K1d is chosen to provide a loop bandwidth of 0.10 Hz. The transmit power control algorithm is the same independent of whether a call is in progress on the handset.

CARRIER PULL-IN AND TRACKING (HANDSETS ONLY)

Figure 14:
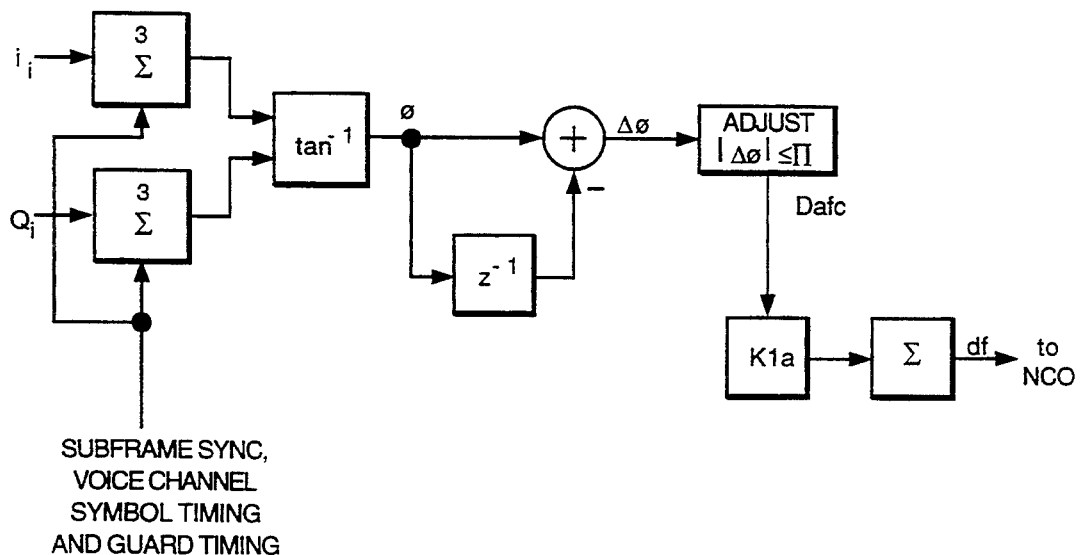
FIG. 14 is a diagram of the frequency discriminator and AFC carrier tracking loop incorporated in the invention.
Figure 15:
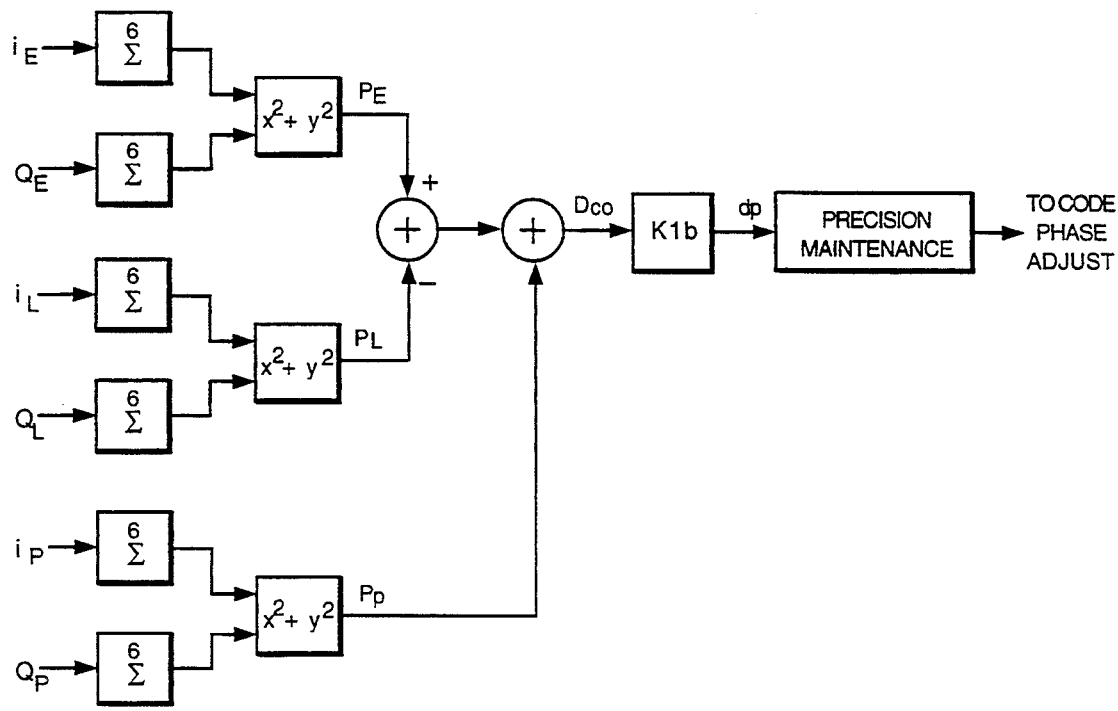
FIG. 15 illustrates a PN code phase discriminator and tracking loop at handset incorporated in the invention.

Carrier pull-in and tracking are achieved using the AFC function described in the following, which is enabled on the first OW symbol count of 0 following subframe sync. FIG. 14 exemplifies the frequency discriminator and AFC carrier tracking loop subsystem used in the invention.

Base on the power measurements taken during the sounding bursts, if PWR1>PWR2, then let k=1 (else k=2) and compute the discriminator Dafc as
Dafc=adjust (phi2−phi1)
where
phi1=atan (Qk1, Ik1)

phi2=atan (Qk2, Ik2)

adjust (x)=if abs(x)<pi then x else x−2*pi*sign (x).
and the subscripts 1 and 2 denote samples taken during the first and second halves of each sounding burst, respectively.

Next, input Dafc to a first-order AFC loop $$df = df + K1a * Dafc \pm 3450/pi$$

and output df+nominal, scaled appropriately, to the carrier NCO. The loop is iterated at the subframe rate, i.e. 100 Hz and K1a is chosen to provide a loop bandwidth of 6 Hz. The discriminator operates only on outbound order wire sounding bursts and has a range of ±3450 Hz.

Carrier pull-in will be essentially complete within three loop time constants, or about 0.15 sec, so at that time the data demodulation function is enabled.

The carrier tracking function is the same, independent of whether a call is in progress on the handset.

CODE PHASE TRACKING

Code phase tracking is performed both at the handsets and at the base stations, but it is done differently in either place. This following describes the code phase tracking algorithms both for handsets and for base stations.

Code phase tracking is accomplished at the handsets using the delay lock loop function described following, which is enabled on the first OW symbol count of 0 following subframe sync.

Base on the power measurements taken during the sounding bursts, if PWR1>PWR2 then let k=1(else k=2), and compute the discriminator Dco as $$Dco = (Pe - Pl)/Pp$$

where $$Pe = (Iek1 + Iek2)\ 2 + (Qek1 + Qek2)\ 2$$

$$Pl = (Ilk1 + Ilk2)\ 2 + (Qlk1 + Qlk2)\ 2$$

$$Pp = (Ipk1 + Ipk2)\ 2 + (Qpk1 + Qpk2)\ 2$$

and the subscripts e, l, and p denote measures taken with the reference code displaced ½ chip early and ½ chip late relative to nominal, and at nominal, respectively, and the subscripts 1 and 2 denote samples taken during the first and second halves of each sounding burst, respectively.

Dco is then input to a first order delay lock loop $$dp = K1b * Dco/4$$

and the loop output dp is used to adjust the code phase in units of 1/16 of a chip. The loop is iterated at the subframe rate, i.e. at 100 Hz, and K1b is chosen to provide a loop bandwidth of 6 Hz.

Note that the code phase tracking function is the same at each handset, independent of whether a call is in progress on that handset.

CODE PHASE TRACKING AT BASE STATIONS

Figure 16:
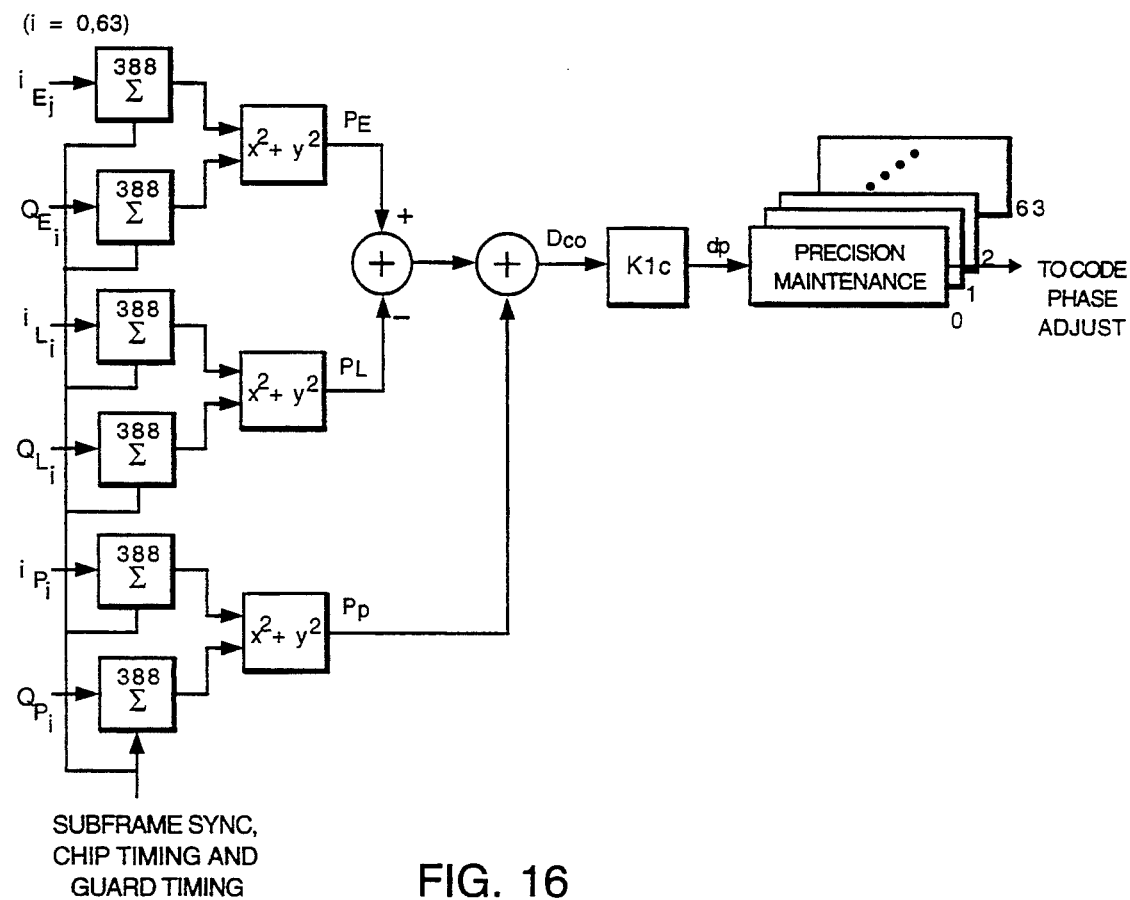
FIG. 16 illustrates a PN code phase discriminator and tracking loop at a base station.

In order to maximize the synchronicity of the inbound signals at each base station, the code phase at arrival is measured for each handset in each community at the base station associated with that community. This process, illustrated in FIG. 16, is implement as follows:

Each handset has an associated 7-bit ID number which it receives from the base station at the time it joins that base station community. Handsets with ID numbers from 0 to 63 are implicitly associated with order wire subgroup 0 of that base station; those with ID numbers from 64 to 127 are implicitly associated with order wire subgroup 1. Each order wire channel must thus support up to 64 handsets.

During the Handset Sync portion of each inbound half subframe, the handset whose ID number modulo 64 equals the number of the current subframe within the frame transmits a 12⅛ symbol all-ones sync burst. The base station receives this burst and computes the discriminator Dco2 as $$Dco2 = (Pe - Pl)/Pp$$

where $$Pe = Ie\ 2 + Qe\ 2$$

$$Pl = Il\ 2 + Ql\ 2$$

$$Pp = Ip\ 2 + Qp\ 2$$

and the subscripts e, l, and p denote measures taken with the reference code displaced ½ chip early and ½ chip late relative to nominal, and at nominal, respectively, and each of the I and Q inputs have been coherently integrated over the full 12⅛ symbol (388-chip) measurement period.

Dco2 is then input to a first order delay lock Loop $$dp = K1c * Dco2/4$$

and the loop output dp is used to adjust the handset transmit code phase in units of 1/16 of a chip. This function is iterated at the subframe rate, i.e. at 100 Hz, so for each handset, it's at the frame rate (640 msec, or 1.56 Hz), and K1c is chosen to provide a loop bandwidth of 0.02 Hz.

The loops are actually closed via communication with each handset, using the order wire channel for handsets with no call in progress or using the voice channel control field for handsets with calls in progress. Other than this difference, the code phase tracking function at the base station is the same for each handset, independent of whether a call is in progress on the handset.

DATA DEMODULATION

Once its AFC loop has settled, a handset may begin to demodulate order wire data and engage in order wire dialogs with the base station in order to subscribe to and participate ill the cell community as described earlier. Once it has subscribed to a particular community or cell, it may then receive and originate calls, initially via the order wire channel but predominantly via a voice channel, which of course requires voice channel data demodulation as well.

The algorithm used to demodulate this data is a combination of block phase estimation, which adjusts the phase of the received symbols for optimum detection in the presence of phase and frequency offsets, and differential data decoding of the receive symbols. This algorithm is applied straightforwardly to the voice channel and with minor modifications to the order wire channel. For the voice channel, the algorithm operates as shown in FIG. 4.6.1 and described as follows:

For each of the 91 symbols (Ij, Qj) following the sounding bursts (in the handset) or the handset sync burst (in the base station), compute the equivalent symbols (14j, Q4j) (with the date removed) as (I2, Q2)=(Ij, Qj) 2
(14j, Q4j)=(I2, Q2)°2.

Then initialize the block integrators and phase estimate as
SumI4=Sum (14j, j=0,15); block length
SumQ4=Sum (Q4j, j=0,15); =16 symbols
Phi4=atan (SumQ4, SumI4)
Phi= −Phi4/4+pi/4
PhiO=Phi and rotate the first 8 symbols (Ij,Qj), j=0,7, by Phi:

(Ij,Qj)=(Ij, Qj)* (cos(Phi), sin(Phi)).

For the next 75 symbols (Ij, Qj), j=8,82, update the block integrators and phase estimate and rotate the symbol accordingly:
SumI4=SumI4+14(j+8)−14(j−8)
SumQ4=SumQ4+Q4(j+8)−Q4(j−8)
Phi4=atan (SumQ4,SumI4)
Phi= −Phi4/4+pi/4+Ntrack*pi/2
(Ij,Qj)=(Ij,Qj)* (cos(Phi), sin(Phi))
PhiO=Phi where Ntrack=0, 1, 2 or 3 such that ABS (Phi−PhiO) is a minimum, i.e., so as to produce minimum rotation relative to the previous rotation.

Next, rotate the final 8 symbols (Ij,Qj),j=83,90, by the final value of Phi:

(Ij,Qj)=(Ij,Qj)*(cos (Phi), sin (Phi)).

Figure 17:
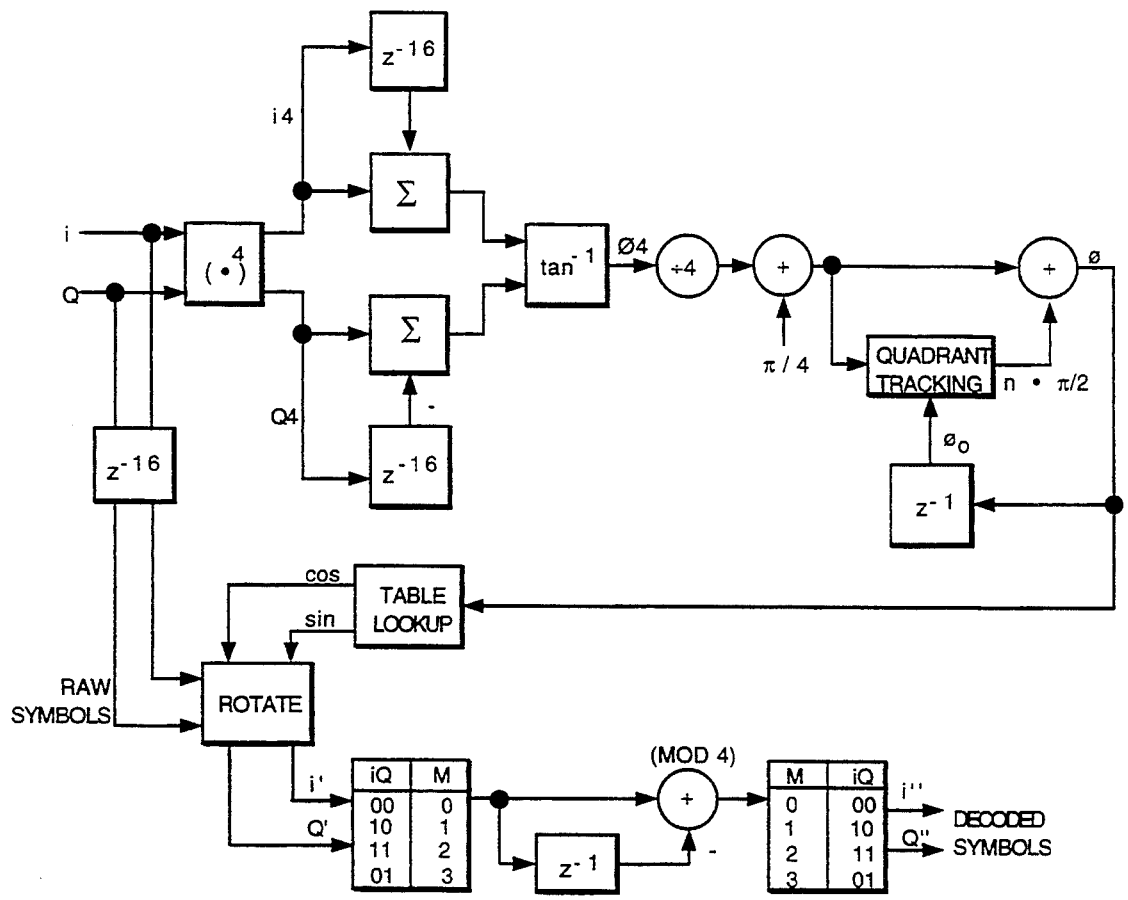
FIG. 17 is an exemplary block phase estimation and differential data decoding circuits incorporated in the invention.
Figure 18:
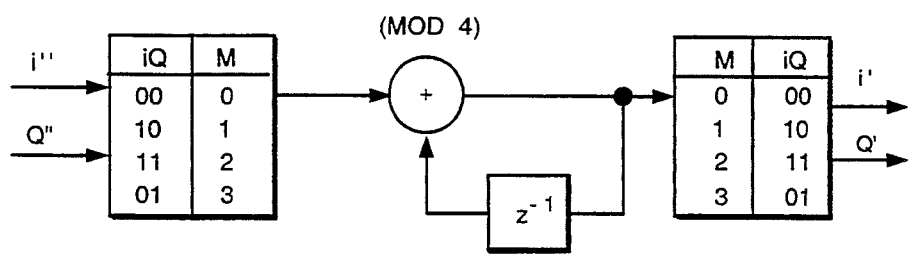
FIG. 18 is a diagrammatic illustration of differential data encoding incorporated in the invention.

Finally, quantize the rotated symbols to 00, 01, 10, or 11 according to the sign of Ij and Qj (Ij,Qj)=(sign(Ij),sign(Qj)), j=0,90, and input the result to the differential decoder as shown in FIG. 17. Symbols 1 through 90 of the decoder output are the demodulated data for this burst. (Date to be transmitted are first differentially encoded as shown in FIG. 18.

For the order wire channel, the algorithm is essentially the same except that the block length is 2 OW symbols rather than 16 voice channel symbols, and the phase reference symbol is shorter than the other OW symbols. Also, the frame sync portion of each order wire burst is handled differently, namely as 7 voice channel symbols. Thus the algorithm becomes:

For each of the 11 symbols (Ij,Qj) following the sounding bursts (in the handset) or the handset sync burst (in the base station), compute the equivalent symbols (I4j,Q4j) with the data removed, as (I2,Q2)=(Ij,Qj) 2

(I4j,Q4j)=(I2,Q2) 2.

Then initialize the block integrators and phase estimate as
SumI4=Sum (14j,j=0,1); block length=
SumQ4=Sum (Q4j,j=0,1); 2 OW symbols
Phi4=atan (SumQ4,SumI4)
Phi= −Phi4/4+pi/4
Phi0=Phi and rotate the first symbol (I0,Q0) by Phi:

(I0,Q0)=(I0,Q0)* (cos (Phi), sin (Phi)).

For tile next 10 symbols (Ij,Qj), j=1,10, update the block integrators and phase estimate and rotate the symbol accordingly:
SumI4=SumI4+I4(j+1)−I4(j−1)
SumQ4 =SumQ4+Q4(j+1)−Q4(j−1)
Phi4=atan (SumQ4,SumI4)
Phi= −Phi4/4+pi/4+Ntrack *pi/2

(Ij,Qj)=(Ij,Qj)* (cos (Phi), sin (Phi))

Phi0=Phi
where
Ntrack=0, 1, 2, or 3 such that ABS (Phi−Phi0) is a minimum, i.e. so as to produce minimum rotation relative to the previous rotation.

Next, rotate the 7 frame sync symbols (Ij,Qj),j=11,17, by the final value of Phi:

(Ij,Qj)=(Ij,Qj)*(cos (Phi),sin (Phi)).

Finally, quantize the rotated symbols to 00, 01, 10, or 11 according to the sign of Ij and Qj (Ij,Qj)=(sign(Ij),sign(Qj)), j=0,17, and input the result to the differential decoder. Symbols 1 through 10 of the decoder output are the demodulated OW data for this burst. Symbols 11 through 17 of the decoder output are the demodulated frame sync data for this burst. (OW data to be transmitted are also first differentially encoded.)

SCOUTING, ROAMING, AND CELL TRANSFER

The system implements certain features to support rapid cell transfer. One of these is the maintenance and broadcast of a database of the relative time offsets of adjacent cell base stations. The information in the database is supplied by handsets which acquire adjacent cell order wire signals on a scouting or roaming basis.

Again, scouting activity is essentially roaming activity, but with the intent of gathering data about the surrounding environment, rather than of actually transferring cell membership. Scouting handsets relay time offset information regarding adjacent cells back to the base station of their currently assigned cell; roaming handsets which transfer to an adjacent cell impart this information regarding previous cell timing to the base station of the new cell.

The information so gathered is verified and broadcast by each base station via the order wire channel and via the channel control portion of each active voice channel.

Scouting and roaming searches differ from initial searches primarily in that they are more focussed, that is, they search at only a single frequency, namely the handset's current carrier tracking frequency within the current cell, and, at least initially, they search only a few chips of PN code phase uncertainty (proportional to data staleness). The other main difference is that carrier frequency, PN code phase, and power level tracking operations are maintained on the original signal during scouting and roaming searches.

SCOUTING

For scouting, if the more focussed search fails on both antennas, it is then broadened to include all 255 PN chips code phase uncertainty. If even this broader search fails on both antennas, the current scouting effort is terminated and normal operation within the current cell is resumed, without a scouting report (Adjacent cell Time Offset report) being submitted to the base station.

If any of the searches succeed, however, subframe and frame synchronization are also performed and a scouting report submitted.

ROAMING AND CELL TRANSFER

Received power is measured once each subframe. A filtered average of this measure is also maintained so as to provide a 2-second time constant. Whenever this filtered average falls below a threshold defined by the signal level at which transfer to another cell becomes desirable, a roaming search is initiated, which searches first for the adjacent cell order wire signal most recently acquired.

If this focussed search fails on both antennas, a similar search is conducted on both antennas for the next most likely adjacent signal to be acquired, and so on, until all adjacent signals have been searched. For each adjacent signal acquired, if the measured power level on that signal is greater than on the current signal, then the handset listens for a Base Station Memberships Available broadcast.

If memberships are available (and, if a call is in progress on the handset, if voice channels are also available), then the handset issues a Membership Enrollment request. On verification of the enrollment request, the base station conducts an enrollment interview with the handset, and the transfer of the handset membership, to the adjacent cell base station is completed, along with any call in progress on the handset.

SIGNAL PRESENCE MONITORING AT BASE STATIONS

In order to detect those situations in which a handset signal can reasonably be assumed to be lost, especially if it is currently assigned a voice channel and voice channels are currently in high demand, a filtered average of the received power from each of the handset sync periods is maintained as:

$$Fp(j) = (1-K1f)*Fp(j) + K1f*Prcv(j)$$

where
Prcv(j) = Ip 2 + Qp 2, Ip and Qp integrated coherently over 12⅜ symbols, and where K1f is chosen to provide a time constant of 2 seconds. Whenever the Fp value for any handset j falls below a specified lower threshold, the handset is noted as being off-line; whenever its Fp value returns above an upper threshold, it is noted as being on-line.

Any call in progress on a handset determined to be off-line is terminated. Incoming calls whose destination handset is off-line are given a busy signal.

AUTOMATIC GAIN CONTROL (AGC) IN HANDSETS

Figure 19:
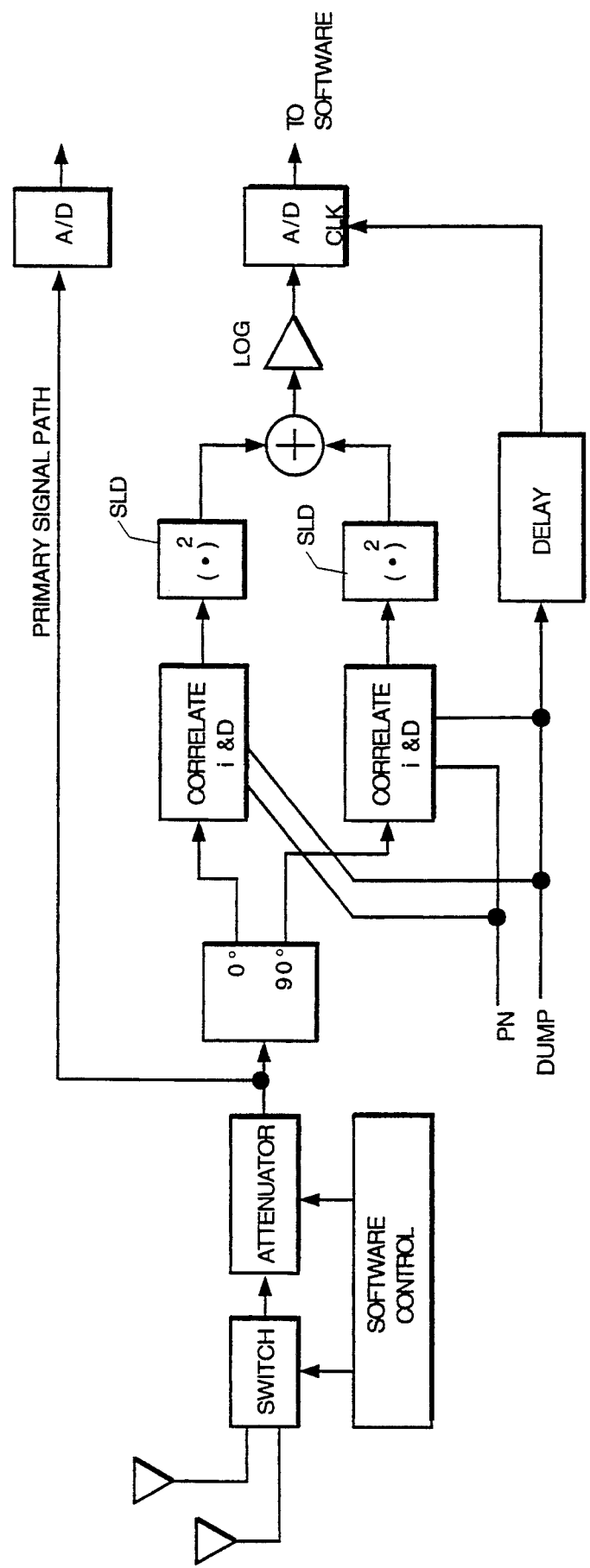
FIG. 19 is a block diagram of automatic gain control (AGC) in the handsets.

In order to minimize the dynamic range requirements (and thus the power and cost) of the signal-path A-to-D converter used in handsets, some form of automatic gain control (AGC) of the A-to-D input signal is required. FIG. 19 depicts the AGC approach selected for this system. The concept is as follows:

During each sounding burst, the analog input signal is correlated with the reference PN waveform and coherently integrated over 6 symbols, then dumped to square-law devices SLD whose outputs are summed and log-amplified, then converted to digital. This digital log-domain power measure is read by software at the end of each sounding burst. At the end of the second burst, the larger of the two power measures (Pmax) is selected by software to get the signal-path attenuation for the remainder of the current subframe and the sounding period of the following subframe. The attenuation is determined as:

$$Atten = Atten + Kpow * (Pmax-Plimit + 6 \text{ dB})$$

where Kpow is a function of the log amplifier gain and attenuator gain. The attenuator setting is also used in the determination of the handset transmit power setting for the current subframe.

For signal acquisition, the attenuator is set (separately for each antenna and for each new code phase and carrier frequency uncertainty range scan) so that the rms noise level P0 is 18 db below the maximum A-to-D converter input level, thus:

$$Attn = Attn + Kpow * (P0-Plim + 18db).$$

An embedded microcontroller or microprocessor can be used to control not only the operational sequences involved in command handling, but there are decided advantages to incorporating not only the sequence control functions but much of the signal processing as well into a programmable device such as a digital signal processor. These advantages include:

reduced hardware design time, due to:
having fewer parts to incorporate
no ASIC design time or fab lead time
greatly reduced FPGA complexity and design time;
increased flexibility to modify or fine-tune algorithms once the system is already built and in test.

While a preferred embodiment of the invention has been shown and described, it will be appreciated that various modifications and adaptations of the invention will be obvious to those skilled in the art and still be within the spirit and scope of the invention as set forth in the claims appended hereto.

What is claimed is:

1. In a wireless telephone system comprising a base station equipped with multiple transmitting/receiving units, and a multiplicity of user handsets equipped with single transmitting/receiving units, the improvement characterized by each transmitter/receiver units comprising:
analog-digital and digital-analog conversion means to convert analog voice signals to digital form to form digitized voice signals and convert digital signals to analog voice signals respectively;
a source of pseudo-noise digital signals whose signal pattern repeats with a specified period;
means to modulate said digitized voice signals with said pseudo-noise digital signals and produce thereby a baseband spread-spectrum signal, including means to demodulate said baseband spread-spectrum signal, using the same pseudo-noise signal, to produce digital voice signals from received spread-spectrum signals;
each user handset unit employing a unique pseudo-noise digital signal identical to that of a transmitter-receiver in the base station unit;
means in each handset and in the base station to generate a single radio-frequency carrier whose nominal frequency is selected in uniform spaced increments of the spread-spectrum signal across an available communications band;

means in each transmitter/receiver to modulate said carrier frequency with said spread-spectrum signal to produce a transmission signal, and means to demodulate such a transmission signal to produce a baseband spread-spectrum signal;

antenna means in each handset and base station unit to transmit or receive said transmission signal;

said base station, incorporating one transceiver for each active user handset.

2. A wireless telephone system according to claim 1 wherein said antenna means in a handset includes a whip antenna and a loop antenna.

3. A wireless telephone system as defined in claim 2 wherein said loop antenna is an Alford loop.

4. A wireless telephone system according to claim 1 wherein groups of digitalized voice pulses are time-compressed by a factor greater than 2, the resulting pulse bursts being alternately transmitted and received between base station and user handset to time-duplex two-way communications between them.

5. A wireless telephone system according to claim 4 wherein each data pulse burst transmitted between base station and user handset includes additional pulses that can be allocated to channel control functions while communication is under way between a given handset and the base station.

6. A wireless telephone system according to claim 4 wherein said system includes a separate two-way order wire channel for providing selected predetermined system control functions, including placement of calls from user handsets said separate two-way order wire channels being usable by the base station and handsets which are not currently communicating with the base station but are attempting to initiate communications.

7. A cellular wireless telephone system comprising a plurality of single base station as defined in claim 6 and wherein said plurality of base stations are arranged physically to cover partially overlapping cellular service areas, and there are cell initiating handsets, and wherein each initiating handset has sequencing means to detect and evaluate order-wire signals from all nearby base station and to initiate communications through the base station whose received signal is strongest at said initiating handset's location.

8. A cellular wireless telephone system according to claim 7, in which a given handset user may communicate with another handset user or a remote telephone user initially through the base station in the cell in which said given handset is located when the call is placed, and if said given handset is physically moved during the call, can obtain service through other base stations serving cellular regions into which said given handset is moved.

9. The wireless telephone system defined in claim 1 including means to connect the signals for each user handset to an external communications switching device.

10. In a wireless telephone system comprising a base station equipped with multiple transmitting/receiving units, and a multiplicity of user handsets equipped with single transmitting/receiving units, the improvement comprising:

each transmitter/receiver unit comprising:

analog-digital and digital-analog conversion means to convert analog voice signals to digital form to form digitized voice signals and convert digital signals to analog voice signals, respectively;

a source of pseudo-noise digital signals whose signal pattern repeats with a specified period;

means to modulate said digitized voice signals with said pseudo-noise digital signals and produce thereby a baseband spread-spectrum signal, including means to demodulate said baseband spread-spectrum signal, using the same pseudo-noise signal, to produce digital voice signals from received spread-spectrum signals;

each user handset unit employing a unique pseudo-noise digital signal identical to that of a transmitter-receiver in the base station unit;

means in each handset and in the base station to generate a single radio-frequency carrier whose nominal frequency is selected in uniform spaced increments of the spread-spectrum signal across an available communication band;

means in each transmitter/receiver to modulate said carrier frequency with said spread-spectrum signal to produce a transmission signal, and means to demodulate such a transmission signal to produce a baseband spread-spectrum signal;

first antenna means in said base station unit to transmit or receive said transmission signal and second antenna means in each handset, each said second antenna means including a whip antenna and a loop antenna and means for selecting one of said loop or whip antenna according to the power of signals detected thereby;

said base station, incorporating one transceiver for each user handset.

11. A wireless telephone system according to claim 10 wherein groups of digitalized voice pulses are time-compressed by a factor greater than 2, the resulting pulse bursts being alternately transmitted and received between base station and user handset, and thereby time-duplex two-way communications between them.

12. A wireless telephone system according to claim 11 wherein each data pulse burst transmitted between base station and user handset includes additional pulses that can be allocated to channel control functions while communication is under way between a given handset and the base station.

13. A wireless telephone system according to claim 12 wherein said system includes a separate two-way order wire channel for providing selected predetermined system control functions, including placement of calls from user handsets, said separate two-way order wire channel being usable by the base station and handsets which are not currently communicating with the base station but are attempting to initiate communications.

14. A cellular wireless telephone system comprising a plurality of single base stations as defined claim 13 and wherein said plurality of base stations are arranged physically to cover partially overlapping cellular service areas and there are cell initiating handsets, and wherein each call initiating handset has sequencing means to detect and evaluate order-wire signals from all nearby base station and to initiate communications through the base station whose received signal is strongest at said initiating handset's location.

15. A cellular wireless telephone system according to claim 14, in which a given handset user may communicate with another handset user or a remote telephone user initially through the base station in the cell in which said given handset is located when the call is placed, and if said given handset is physically moved during the call, can obtain service through other base stations serving cellular regions into which said given handset is moved.

* * * * *